Feb. 24, 1925.

E. E. SCHELLENGER 1,527,333

SIX-WHEEL TRUCK WITH DUPLEX DRIVE

Filed Sept. 15, 1921      4 Sheets-Sheet 1

INVENTOR.
Elmer E. Schellenger
BY Herman Miller
ATTORNEY.

Feb. 24, 1925.

E. E. SCHELLENGER 1,527,333

SIX-WHEEL TRUCK WITH DUPLEX DRIVE

Filed Sept. 15, 1921  4 Sheets-Sheet 2

INVENTOR.
Elmer E. Schellenger
BY Herman Miller
ATTORNEY.

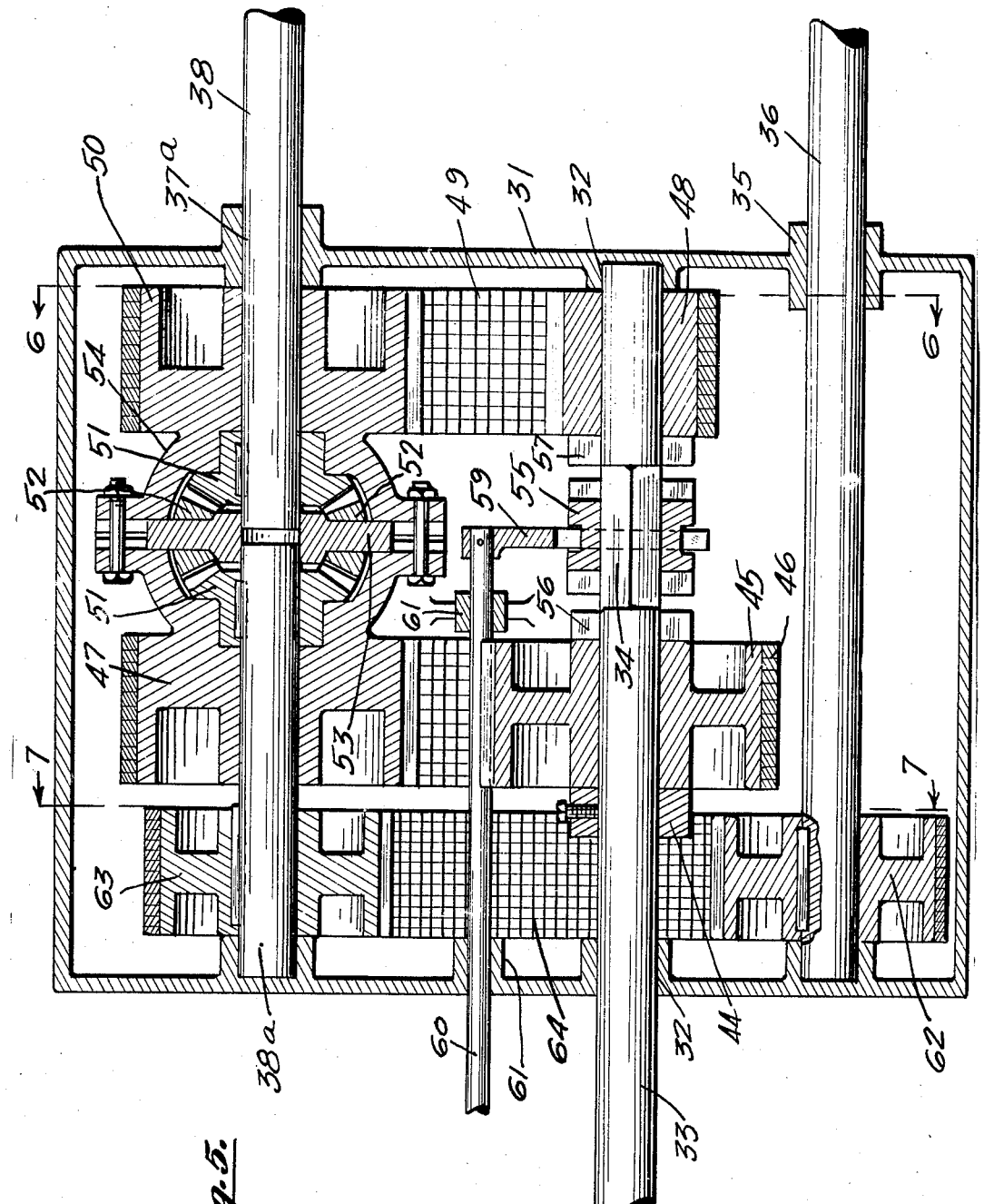

Feb. 24, 1925. 1,527,333
E. E. SCHELLENGER
SIX-WHEEL TRUCK WITH DUPLEX DRIVE
Filed Sept. 15, 1921 4 Sheets-Sheet 4
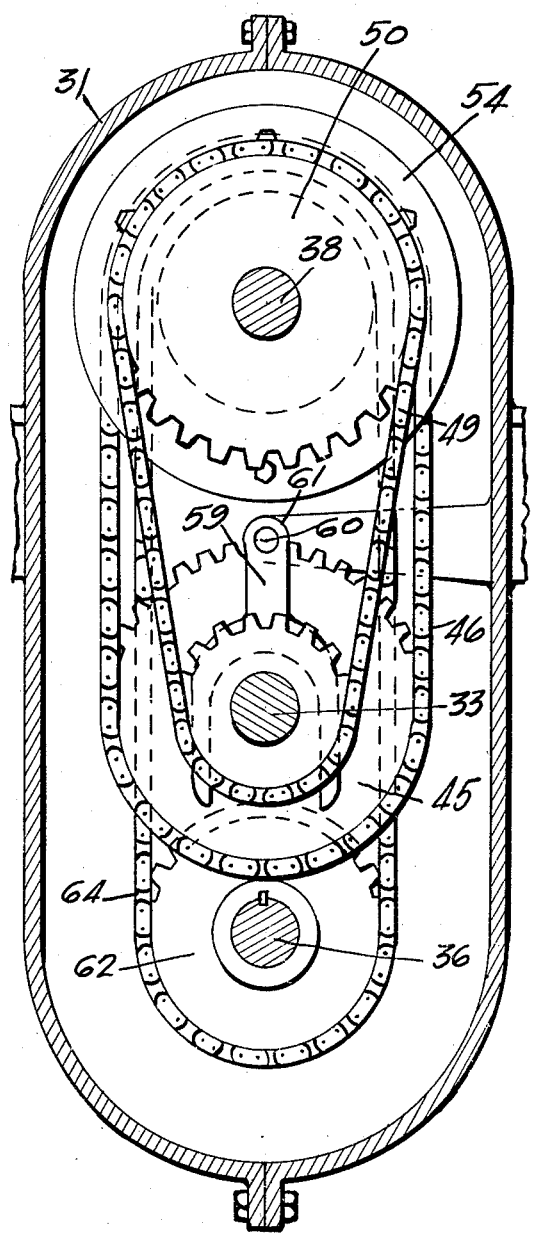
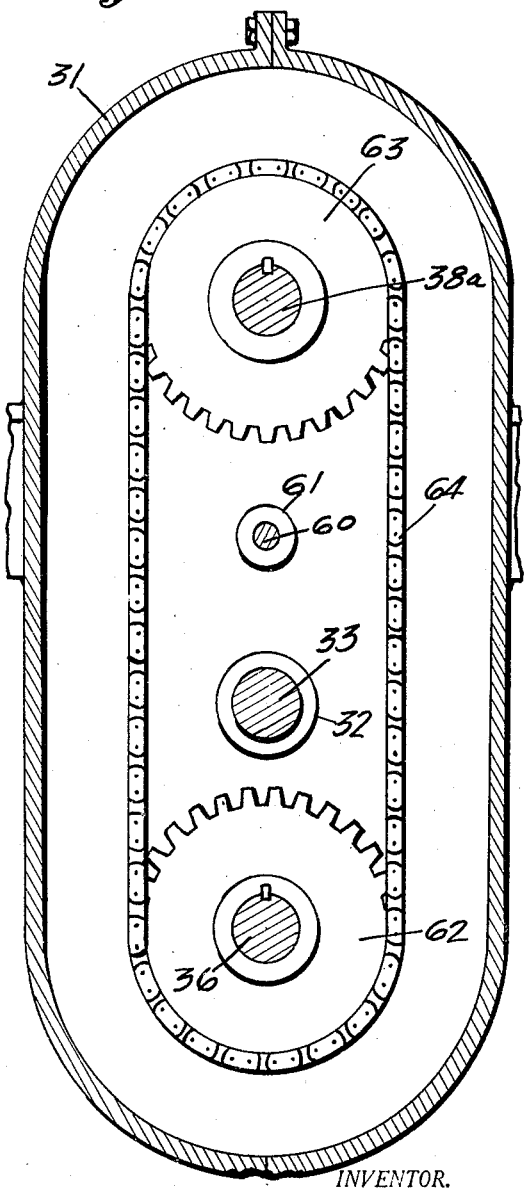
INVENTOR.
Elmer E. Schellenger
BY Herman Miller
ATTORNEY.

Patented Feb. 24, 1925.

1,527,333

UNITED STATES PATENT OFFICE.

ELMER E. SCHELLENGER, OF RIVERSIDE, CALIFORNIA.

SIX-WHEEL TRUCK WITH DUPLEX DRIVE.

Application filed September 15, 1921. Serial No. 500,820.

*To all whom it may concern:*

Be it known that I, ELMER E. SCHELLENGER, a citizen of the United States, residing at Riverside, in the county of Riverside and State of California, have invented new and useful Improvements in Six-Wheel Trucks with Duplex Drive, of which the following is a specification.

My invention relates generally to motor driven vehicles and more particularly to the transmission gearing utilized for transmitting power from an engine or motor to the wheels of the vehicle, the principal objects of my invention being to provide relatively simple and practical means for transmitting motion and power from a single source of power to two pairs of the vehicle wheels, which transmission gearing includes a relatively simple, practical and positive acting differential gearing and further to provide an improved form of rocking fifth wheel that may be advantageously employed between a motor driven vehicle and a trailer or additional pair of wheels and which latter provides additional carrying capacity for an ordinary motor vehicle.

With the foregoing and other objects in view, my invention consists in certain novel features of construction and arrangement of parts that will be hereinafter more fully described and claimed and illustrated in the accompanying drawings, in which:

Fig. 5 is an enlarged vertical section taken on line 5—5 of Fig. 2.

Fig. 6 is a cross section taken on the line 6—6 of Fig. 5.

Fig. 7 is a cross section taken on the line 7—7 of Fig. 5.

Figure 1:
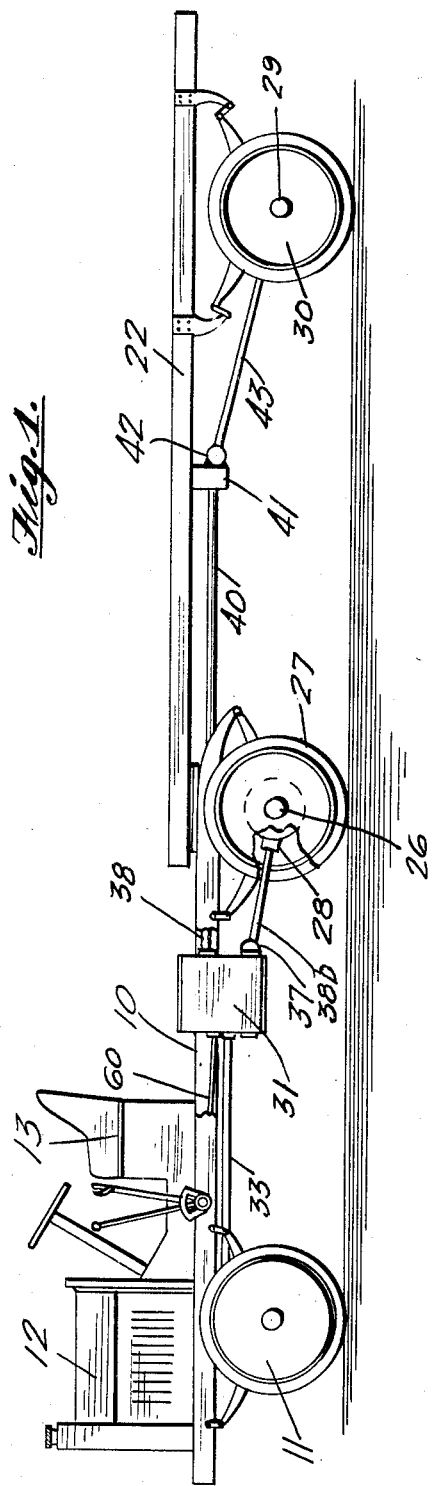
Fig. 1 is a side elevational view of a six-wheel truck of my improved construction.
Figure 2:
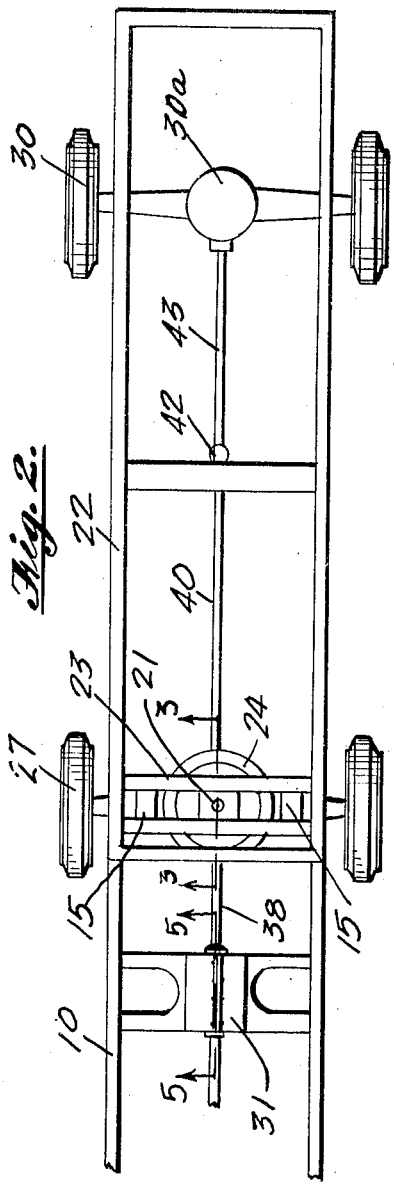
Fig. 2 is a top plan view of the greater portion of the frame of my improved truck, and showing the driving connections thereof.
Figure 3:
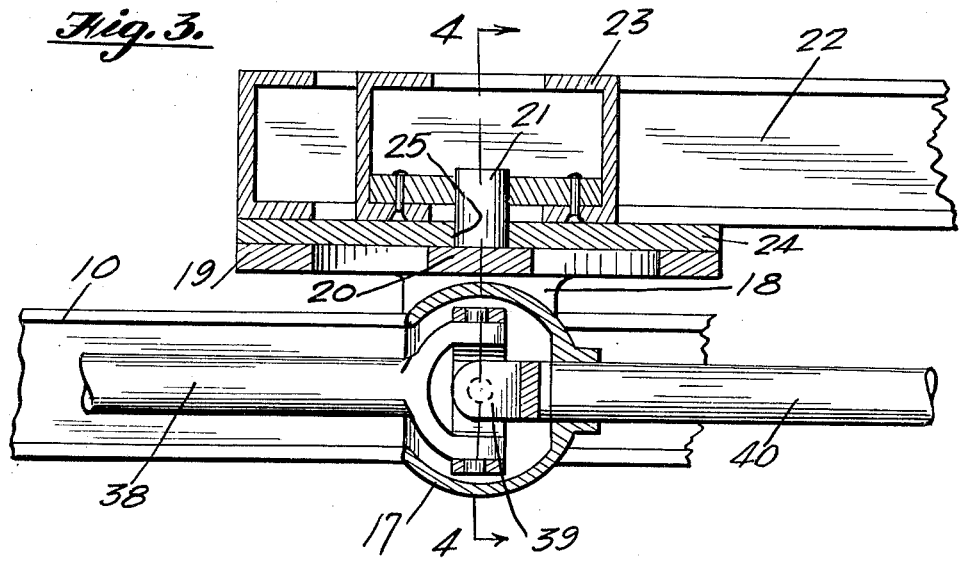
Fig. 3 is an enlarged vertical section taken on the line 3—3 of Fig. 2.
Figure 4:
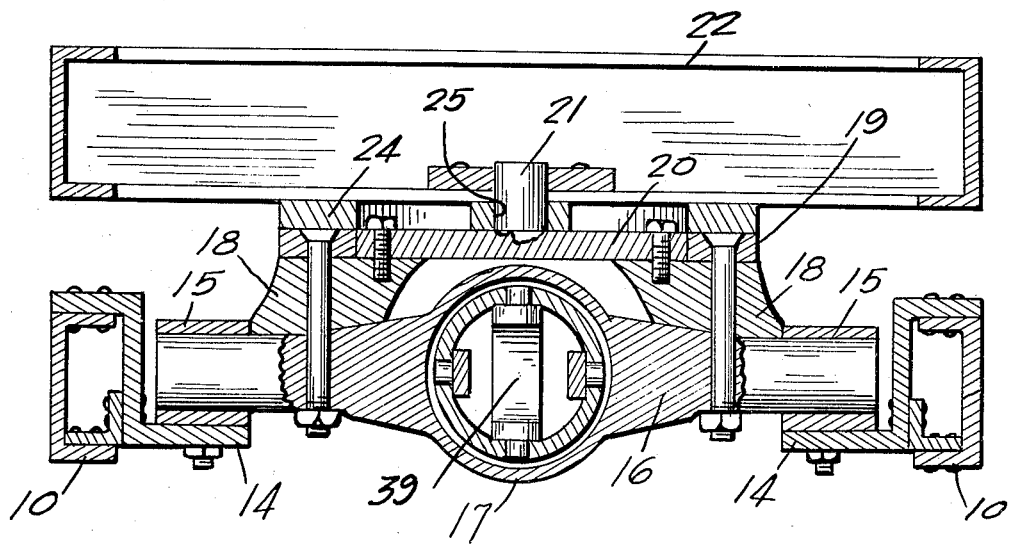
Fig. 4 is a cross section taken on the line 4—4 of Fig. 3.

Referring by numerals to the accompanying drawings which illustrate a practical embodiment of my invention, 10 designates the front frame of the truck, beneath the front end of which is arranged a pair of steering wheels 11, and positioned on said frame above said wheels, is a suitable power producing mechanism, preferably an internal combustion engine that is enclosed within a hood or housing 12.

Arranged on the front frame 10, immediately to the rear of the engine, is a driver's seat 13, adjacent to which are the usual control and brake levers, and the steering wheel.

Projecting inwardly from the rear portions of the side rails of the front frame 10, are brackets 14, on which are secured journal boxes 15, and bearing therein are the end portions of a transversely disposed shaft 16, at the center of which is formed a substantially hollow spherical housing 17.

Secured to shaft 16, to the sides of this housing and on the top thereof, are bearing blocks 18, and secured on the top thereof is a bearing ring 19. Secured to said blocks and arranged within said ring is a disk 20, from the center of which projects upwardly, a relatively short pin 21.

The front portion of the rear frame 22 of the truck overlies the rear end of front frame 10, and arranged on the front portion of said rear frame, is a transversely disposed rail 23, to the under side of which is fixed a bearing disk 24, that rests directly on top of bearing ring 19, and formed in the center of said bearing plate 24, is an aperture 25, that receives the pin 21. Thus a fifth wheel is provided between the overlapping portions of the front and rear frame and said fifth wheel is supported by the transversely disposed shaft 16 that is arranged to rock in bearings 15 so that the two frames may swing vertically and at the same time move laterally, independently of each other, but upon intersecting axes, as if connected by gimbal bearings.

Supporting the rear portion of front frame 10, is a two-part driving axle, provided with wheels 27, and the parts of which axle are connected by an ordinary differential gearing that is enclosed within a housing 28.

Supporting the rear portion of the rear frame 22, is a two-part axle 29, provided with the usual wheels 30, and the parts of said axle being connected by an ordinary differential gearing that is enclosed within a housing 30ª.

Located at a suitable point on the main frame 10, is a housing 31, and formed in the end walls thereof, are bearings 32 for the motor driven shaft 33, and which latter is provided within said housing with a square or non-circular portion 34, and with alternative connections therefrom to a differential embodied in a variable transmission, as hereinafter described.

Arranged for rotation in bearings 35, in the lower portions of the end walls of housing 31, is a shaft 36, extending rearwardly therefrom and pivotally connected at its rear end by a universal joint 37 to a shaft 38[b] the rear end of which is connected to the differential gearing within housing 28. Thus, said shaft 36 serves as a driving shaft for the driving axle and wheels that support the rear portion of front frame 10.

Arranged for rotation in bearings 37[a], in the upper portions of the end walls of housing 31 is another rearwardly extending shaft 38 that is divided within the housing to form a relatively short section 38[a], and the rear end of said shaft 38 extends into the housing 17 at the center of shaft 16, and within said housing and substantially at the intersection of the axis of the shaft 16 with the axis of the pin 21, said shaft is pivotally connected by a universal joint 39, to the forward end of a shaft 40 that extends rearwardly through a suitable bearing 41, on the under side of frame 22, and the rear end of said shaft 40 is connected by universal joint 42 to the forward end of a shaft 43, the rear end of which latter is directly connected to the differential gearing within the housing 30[b].

Loosely arranged on shaft 33, and retained in position thereupon by a collar 44, is a sprocket wheel 45 and operating thereupon is a sprocket chain 46 that passes over a sprocket wheel 47, and the latter being loosely arranged on shaft section 38[a].

Loosely mounted on shaft 33, is a sprocket wheel 48, that is substantially smaller in diameter than the sprocket wheel 45 and operating on said sprocket wheel 48 is a sprocket chain 49 that passes around a sprocket wheel 50, that is a counter-part of sprocket wheel 47, and which is loosely mounted on shaft 38.

Sprocket wheels 47 and 50 are connected by an ordinary differential gearing that includes a pair of beveled pinions 51, one of which is fixed on shaft 38, and the other on shaft section 38[a].

Arranged between these beveled pinions and meshing therewith, are beveled pinions 52, that are carried by radially arranged studs 53, and which latter are seated in the parts of a housing 54 that are secured to the sprocket wheels 47 and 50.

Arranged for sliding movement upon the square or non-circular portion 34 of shaft 33, is a clutch collar 55, that is adapted to be moved into engagement with a clutch face 56, on the end of sprocket wheel 45, or a clutch face 57 that is formed on the end of a small sprocket wheel 48. Clutch collar 55 is engaged by a yoke 59, and the latter being carried by the end of a longitudinally movable rod 60, the latter being arranged for sliding movement in bearings 61 on housing 31, and the forward end of said rod being connected to a suitable control lever in front of the driver's seat 13.

Fixed on shaft 36 within housing 31, is a sprocket wheel 62, and operating thereupon and a corresponding sprocket wheel 63 that is fixed on shaft section 38[a], is a sprocket chain 64.

To drive the truck at low speed, the lever associated with rod 60 is manipulated so as to move clutch collar 55 into engagement with clutch face 57 on sprocket wheel 48, and when such engagement is effected, the rotary motion of the shaft 33 will be transmitted through sprocket chain 49, sprocket wheel 50 and the differential gearing associated therewith to shaft 38, and simultaneously, rotary motion will be transmitted through differential gearing comprising the parts 51 and 52 to shaft section 38, and through sprocket wheel 63, chain 64 and sprocket wheel 62 to shaft 36.

Inasmuch as the sprocket wheels 62 and 63 are the same diameter, the rotary motion thus transmitted to shafts 36 and 38 will be uniform in speed.

The rotary motion of shaft 36 will be transmitted through universal joint 37 to shaft 38 and from thence through the differential gearing to the wheel carrying sections of driving axle 26. Simultaneously, the rotary motion of shaft 38 will be transmitted through universal joint 39 to shaft 40 and from thence through universal joint 42 to shaft 43, and which latter connects the sections of the rear driving axle 29.

Thus, both sets of driving wheels 27 and 30 will be simultaneously driven at relatively low speed, and when it is desired to drive the same at high speed, rod 60 is manipulated to engage clutch collar 55 with the clutch face 56 on sprocket wheel 45, and following such engagement the rotary motion of shaft 33 will be transmitted at a relatively higher speed through the larger sprocket wheel 45, chain 46 to sprocket wheel 47, and from the latter through the differential gearing comprising the parts 51 and 52 to sprocket wheel 50 on shaft 38. Simultaneously, the relatively high speed rotary motion will be transmitted to shaft 36, through sprocket wheel 63, sprocket chain 64 and sprocket wheel 62.

Thus, the driving shafts 36 and 38 will be rotated at relatively high speed and the driving axles 26 and 29 will be correspondingly driven.

Thus, it will be seen that I have produced a relatively simple and practical six-wheel truck that includes a pair of flexibly connected truck frames and each frame having a pair of positively driven traction wheels, and which latter may be selectively driven at two different speeds.

My improved truck may be easily and cheaply produced, has great carrying capacity and is adaptable for a wide variety of purposes.

It will be understood that minor changes in size, form and construction of the various parts of my improved six-wheel truck may be made and substituted for those herein shown and described without departing from the spirit of my invention, the scope of which is set forth in the appended claims.

I claim as my invention:

1. In a vehicle having a truck mounted on front and rear wheels, a trailer mounted on rear wheels and connected to the truck by a fifth wheel, said fifth wheel construction including a transversely extending rock shaft, a drive shaft extending through the rock shaft and having a universal joint in line with the vertical axis of the fifth wheel and in line with the horizontal axis of the rock shaft.

2. The combination with a vehicle comprising a truck mounted on front wheels and rear wheels, a trailer mounted on rear wheels and connected at its forward end to the rear end of the truck by a fifth wheel adapted to rotate on a vertical axis and rock on a horizontal axis, of a drive shaft extending through the fifth wheel construction and having a universal joint in line with the vertical axis and in line with the horizontal axis, and means for connecting the drive shaft to operate the rear wheels of the trailer.

3. The combination with a vehicle comprising a tractor having front and rear wheels, a trailer having rear wheels and connected to the tractor at its forward end by a fifth wheel construction adapted to rotate on a vertical axis and rock upon a horizontal axis, of an engine mounted upon the tractor, a transmission gearing mounted upon the tractor and operated by the engine shaft, a drive shaft connected to the transmission gearing and extending through the fifth wheel construction and having a universal joint in line with the vertical axis and in line with the horizontal axis and connected to drive the rear wheels of the trailer.

4. The combination with a vehicle comprising a tractor having front and rear wheels, a trailer having rear wheels and connected to the tractor at its forward end by a fifth wheel construction adapted to rotate on a vertical axis and rock upon a horizontal axis, of an engine mounted upon the tractor, a transmission gearing mounted upon the tractor and operated by the engine shaft, a drive shaft connected to the transmission gearing and extending through the fifth wheel construction and having a universal joint in line with the vertical axis and in line with the horizontal axis and connected to drive the rear wheels of the trailer, and a second drive shaft connected to the transmission gearing and connected to drive the rear wheels of the tractor.

5. The combination with a vehicle comprising a tractor having front and rear wheels, a trailer having rear wheels and connected to the tractor at its forward end by a fifth wheel construction adapted to rotate on a vertical axis and rock upon a horizontal axis, of an engine mounted upon the tractor, a transmission gearing mounted upon the tractor and operated by the engine shaft, a drive shaft connected to the transmission gearing and extending through the fifth wheel construction and having a universal point in line with the vertical axis and in line with the horizontal axis and connected to drive the rear wheels of the trailer, and a second drive shaft connected to the transmission gearing and connected to drive the rear wheels of the tractor, said transmission gearing including a differential gearing so as to apply equal power to the drive wheels of the tractor and the drive wheels of the trailer.

In testimony whereof I have signed my name to this specification.

ELMER E. SCHELLENGER.